United States Patent [19]

Blanton, Jr. et al.

[11] Patent Number: 5,715,745

[45] Date of Patent: Feb. 10, 1998

[54] HUMIDIFIED AND HEATED CABINET FOR STORING FOOD

[75] Inventors: Robert L. Blanton, Jr., Columbia; Ted Y. Prosalenti, Hopkins, both of S.C.

[73] Assignee: Food Service Supplies, Inc., Columbia, S.C.

[21] Appl. No.: 827,795

[22] Filed: Apr. 11, 1997

[51] Int. Cl.⁶ .................. A21B 1/00; A21B 1/08; A23L 3/00; A23L 3/06

[52] U.S. Cl. .................. 99/476; 99/448; 99/468; 99/483; 126/20; 126/21 A; 219/400; 219/411

[58] Field of Search ............ 99/448, 357, 467–476, 99/483, 516, 536; 126/21 A, 20, 21 R; 221/150 A, 150 R; 219/400, 401, 348, 411–413, 405, 386; 312/128, 236; 392/399, 395, 403

[56] References Cited

U.S. PATENT DOCUMENTS

| | | | |
|---|---|---|---|
| 3,722,268 | 3/1973 | Rightley | 219/401 X |
| 3,952,609 | 4/1976 | Klemm | 99/474 |
| 4,165,620 | 8/1979 | Kiesel et al. | 99/357 X |
| 4,345,143 | 8/1982 | Craig et al. | 312/236 X |
| 4,646,630 | 3/1987 | McCoy et al. | 99/483 X |
| 4,835,351 | 5/1989 | Smith et al. | 219/400 X |
| 4,939,987 | 7/1990 | Smith | 126/20 X |
| 5,072,666 | 12/1991 | Hullstrung | 99/476 |
| 5,203,258 | 4/1993 | Tippmann et al. | 99/467 X |
| 5,365,039 | 11/1994 | Chaudoir | 99/468 X |
| 5,464,279 | 11/1995 | Wells et al. | 99/448 X |
| 5,532,456 | 7/1996 | Smith et al. | 219/40 |
| 5,595,109 | 1/1997 | Shelton | 99/476 |

*Primary Examiner*—Timothy F. Simone
*Attorney, Agent, or Firm*—Michael A. Mann

[57] ABSTRACT

The present invention is a food storage cabinet that develops and maintains a warm, humid environment in its interior for storage of the food. The food is supported within a storage compartment in the cabinet, and a water bath is provided to produce the warm, humid environment to keep the food warm and moist. A support is positioned within the storage compartment at an angle so that when the door to the storage compartment is opened, ambient air enters the storage compartment and initiates air flow therein. The ambient air drops down through a front gap between the support and the front wall of the storage compartment, thus causing warm, humid air generated by the water bath to rise through a rear gap and "roll" over the food toward the front of the storage compartment. Therefore, by opening the door to the storage compartment, air flow is initiated within the storage compartment to quickly cover the food in warm, humid air. The present invention is also provided with an electro-magnet that operates to temporarily hold the door in its open position for a predetermined amount of time. In another preferred embodiment, a drying chamber is provided that heats, dries and forces air into the storage compartment toward the underside of the door to prevent excessive condensation from forming on the door or on the food.

25 Claims, 6 Drawing Sheets

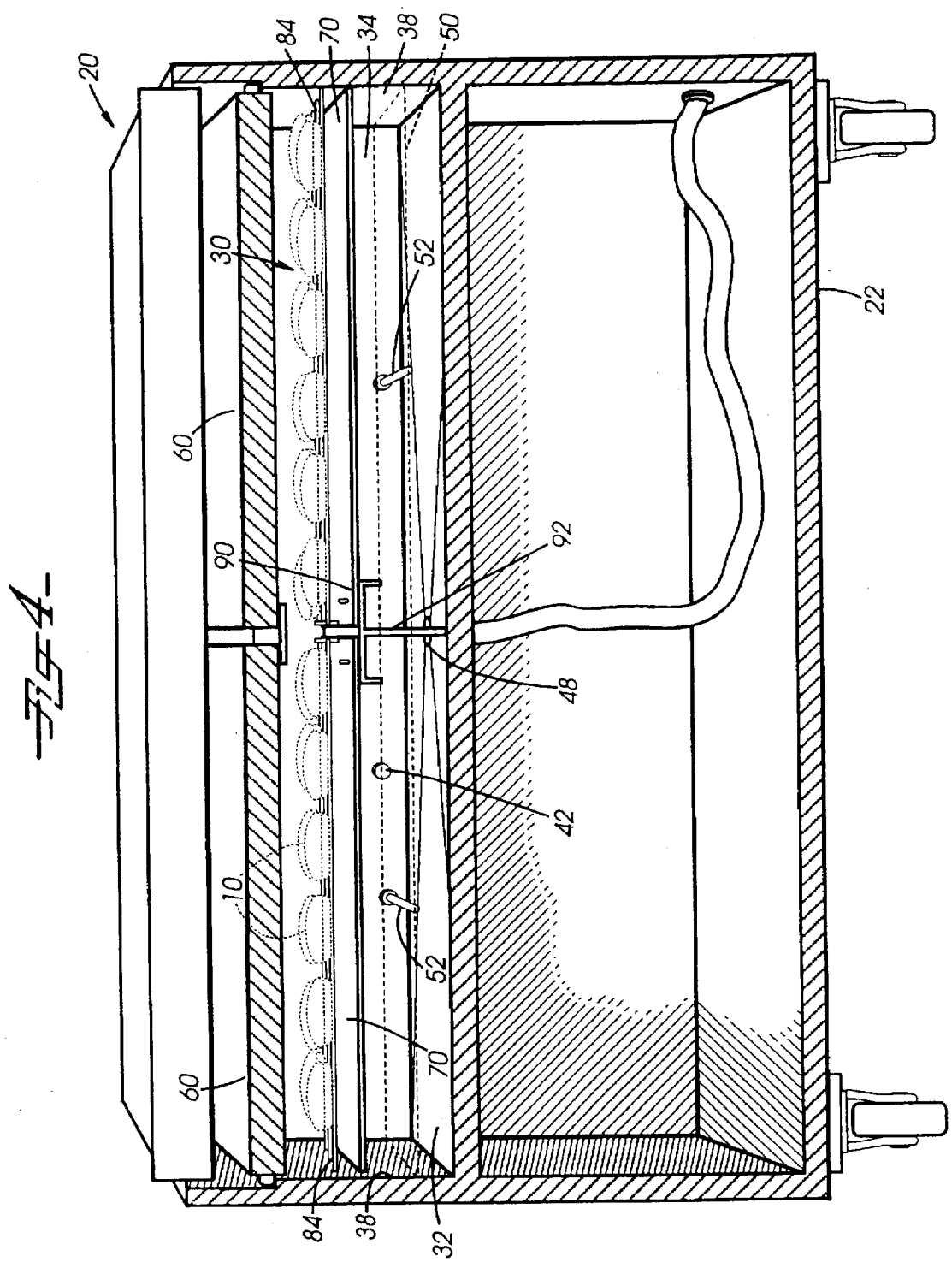

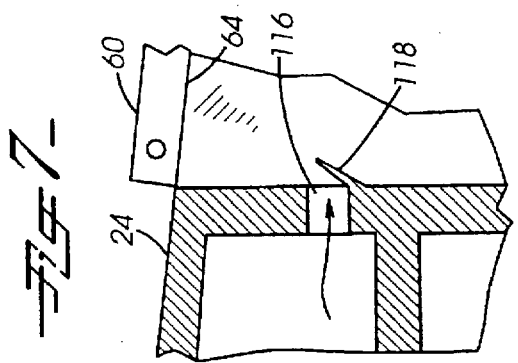
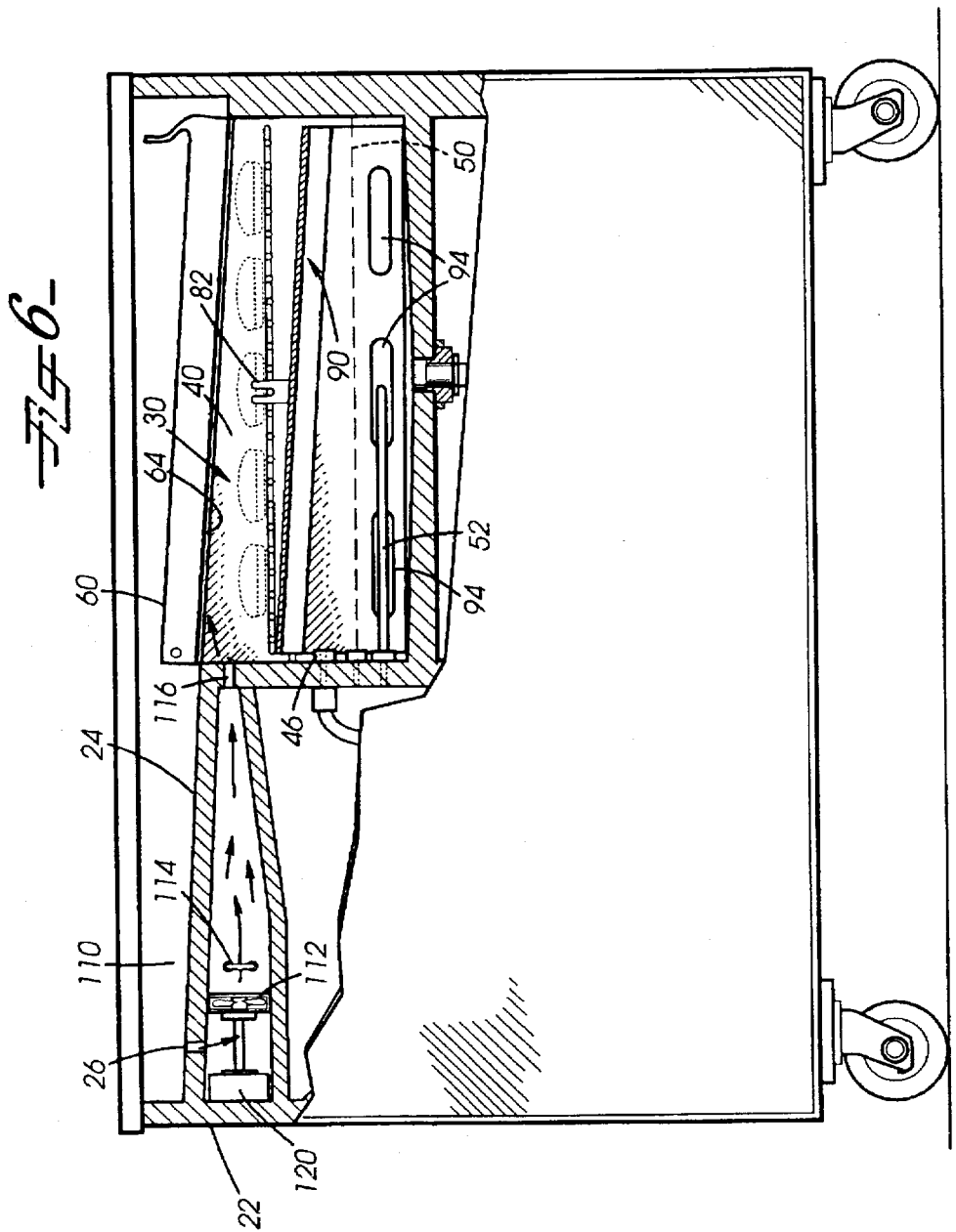

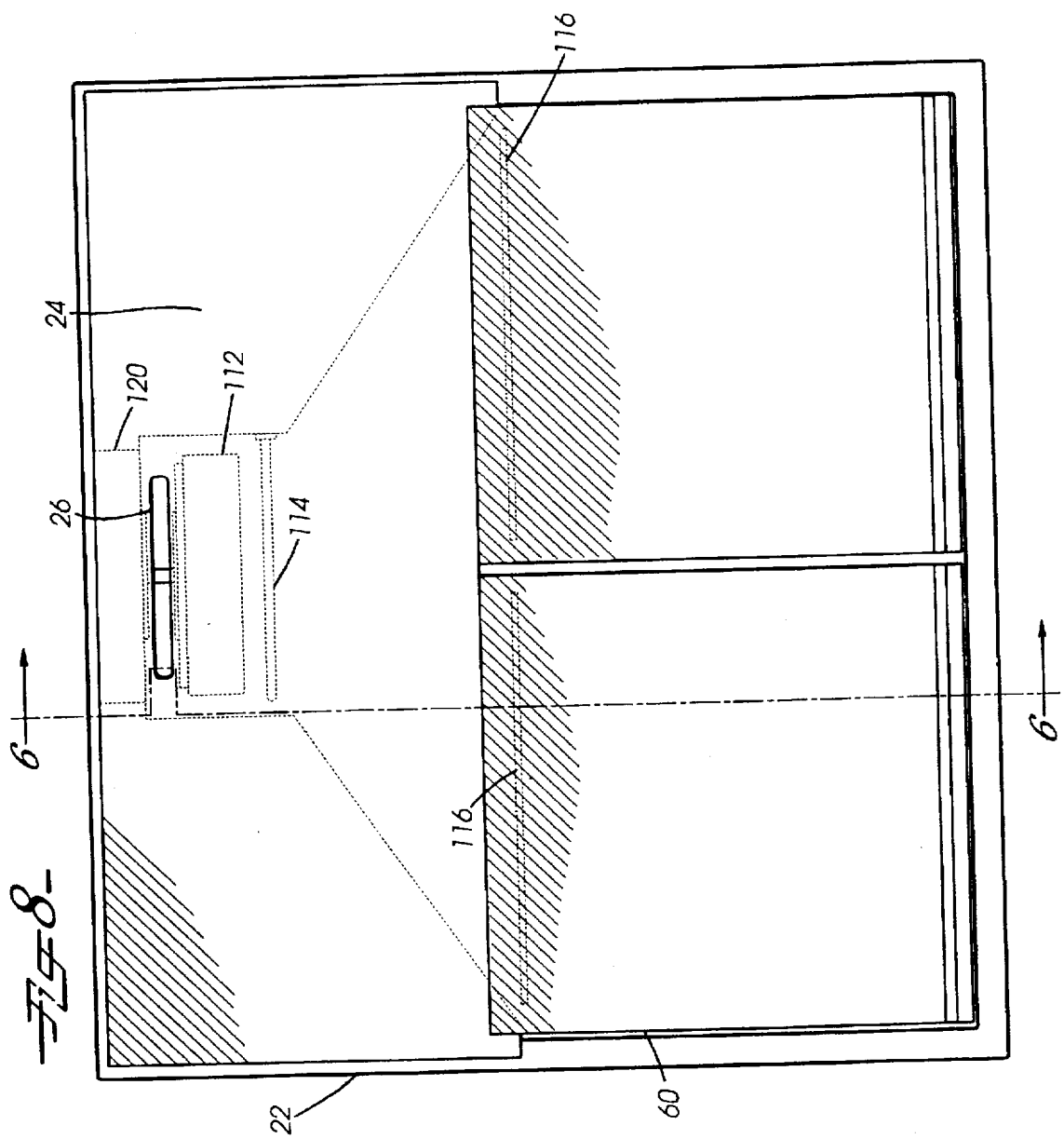

HUMIDIFIED AND HEATED CABINET FOR STORING FOOD

BACKGROUND OF THE INVENTION

1. Field of the Invention

The present invention relates to a cabinet for storing food. In particular, the present invention relates to a cabinet that is heated and humidified.

2. Discussion of Background

Food storage cabinets and steamers are well known. Keeping foods hot and moist until served is an object of many known devices. However, when access to the cabinet is needed on an irregular and sometimes frequent basis, such as in restaurants which have varying demand levels, keeping the food hot and moist may become difficult. It is important to maintain the food in a warm and humid environment so that it will remain moist and pleasant tasting. Consequently, it is necessary to produce warm, humid air within the cabinet and to assure that the food is covered by it. This is especially true when the door to the cabinet is opened, allowing ambient air to rush in and contact the food. The cabinet must be able to return the humidity and temperature levels to the desired levels while limiting the amount of time the food is exposed to the cooler, drier air.

Therefore, there is a need for a food storage cabinet which not only provides warm, humid air over the food, but one that is also able to recover and maintain a warm, humid environment over the food.

SUMMARY OF THE INVENTION

According to its major aspects and broadly stated, the present invention is a cabinet for storing food. The cabinet comprises a frame which carries a storage compartment adapted to hold the food. Within the base of the storage compartment is a water bath that has a pair of heating rods submerged therein. Above the water bath is a support which carries the food. The support is positioned at an angle within the storage compartment, such that its front end is closer to the bottom of the storage compartment than its rear end. In addition, the support is carried by its sides so that a pair of gaps are formed, one between the front end of the support and the front wall of the storage compartment and the other between the rear end of the support and the rear wall of the storage compartment. Both of these gaps are dimensioned to allow fluid to pass therethrough.

There is an opening in the top of the storage compartment which provides access to the food within. A door is carried by the compartment to cover the opening, and has a closed position prohibiting access to the storage compartment and an open position which allows access to the storage compartment through the opening. In addition, the opening in the storage compartment is slightly angled so that the door tends to move relatively slowly toward its closed position after it has been released from its open position.

Furthermore, an electro-magnet is carried by the frame behind the door for temporarily holding the door in its open position. The electro-magnet is activated by a limit switch, so that once the door has been opened far enough, the electro-magnet is activated and secures the door in this position. After a predetermined amount of time, the electro-magnet de-energizes and releases the door, so that it may return to its naturally closed position due to the angle of the opening.

In another preferred embodiment of the present invention, a drying compartment is provided that draws in air from beneath the top of the cabinet. The air is drawn in by a fan forcing the air across a heating element which dries the air. After passing across the heating element, the air flows into the storage compartment. As the air leaves the drying compartment and enters the storage compartment, the air is directed toward the underside of the door.

An important feature of the present invention is the angle of the support positioned within the storage compartment. Because of this slope and in conjunction with the front and rear gaps, the support facilitates air flow within the storage compartment each and every time the door is moved from its closed position. Specifically, when the door is opened, ambient air which is cooler and denser than the warm, humid air within the storage compartment, enters the storage compartment, settling on the support and flowing down through the front gap. The flow of air through the front gap causes the warm, humid air beneath the support to flow upward through the rear gap and over the food toward the front of the storage compartment. Consequently, every time the door is opened, air flow and circulation is initiated within the storage compartment, and in particular, warm, humid air is forced over the food when the door is opened, thus maintaining the food in its preferred environment. In addition, this flow pattern enables the temperature and humidity within the storage compartment to recover to its preferred levels more quickly, without significantly affecting the temperature and humidity around the food.

The support is carried within the storage compartment by pins extending from its side walls and underneath by a baffle. The design of the baffle is another important feature of the present invention. The baffle is designed to help carry the support from the bottom of the storage compartment. In addition, the baffle extends from a position proximate to the front wall of the storage compartment to a position proximate to the rear wall of the storage compartment. Between the two ends of the baffle and above the water line is preferably solid, so that air is not permitted to pass therethrough. By designing the baffle in this fashion, the baffle helps direct the flow of air within the storage compartment when the door is opened. In other words, the baffle helps prevent air from flowing side to side in the storage compartment, but directs it to flow from front to back, much like a vane. However, it is important that the baffle not prohibit the flow of water within the water bath. Therefore, the baffle is provided with a plurality of channels which allow for the migration of water through the baffle.

Another feature of the present invention is the angled opening in combination with the electro-magnet. In a preferred embodiment, the door is provided with rollers which, when positioned over the opening in the storage compartment, allow the door to naturally roll to its closed position due to gravity. In addition, there are times when a person may need to use both hands while accessing the storage compartment. During these times it is advantageous to have the electro-magnet holding the door in the open position. The electro-magnet is activated once the door is moved to its open positioned, where it triggers a limit switch that activates the electro-magnet attracting the door and holding it in the open position. After a predetermined amount of time the door is released and rolls back to its closed position.

Other important features of the present invention include the submersible heating rods, a water level sensor, and a water inlet and outlet. The submersible heating rods are designed to have an internal thermostat so that once set, the water bath is maintained at the chosen temperature. The water level sensor in the storage compartment is positioned so that it will sense if the water level drops. This is especially important because the heating rods should always be covered by water to prevent failures or other accidents. Furthermore, the water sensor is connected to the water inlet so that additional water may be added to the storage compartment if needed. Finally, the water outlet, preferably in the bottom of the storage compartment, allows for the water to be drained, which may be necessary when moving the cabinet or changing the water.

The use of a drying chamber to reduce the amount of humidity in the air that passes across the food in the storage compartment is another important feature of the present invention. With relatively drier air being directed against the underside of the door, condensation on this surface is reduced, thus preventing water from dripping onto the food below. In addition, the drier air does not over-moisten the food.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 4 is a cross-sectional view of the cabinet of FIG. 1 taken along line 4–4, according to a preferred embodiment of the present invention;

FIG. 6 is a cross-sectional view taken along line 6–6 of FIG. 8 of the cabinet showing the drying chamber, according to a preferred embodiment of the present invention;

FIG. 7 is a detail view of the air entering the storage compartment from the drying chamber of the cabinet, according to a preferred embodiment of the present invention; and FIG. 8 is a top view of a cabinet with the top cover removed for clarity and showing the drying chamber, according to a preferred embodiment of the present invention.

DETAILED DESCRIPTION OF A PREFERRED EMBODIMENT

Figure 1:
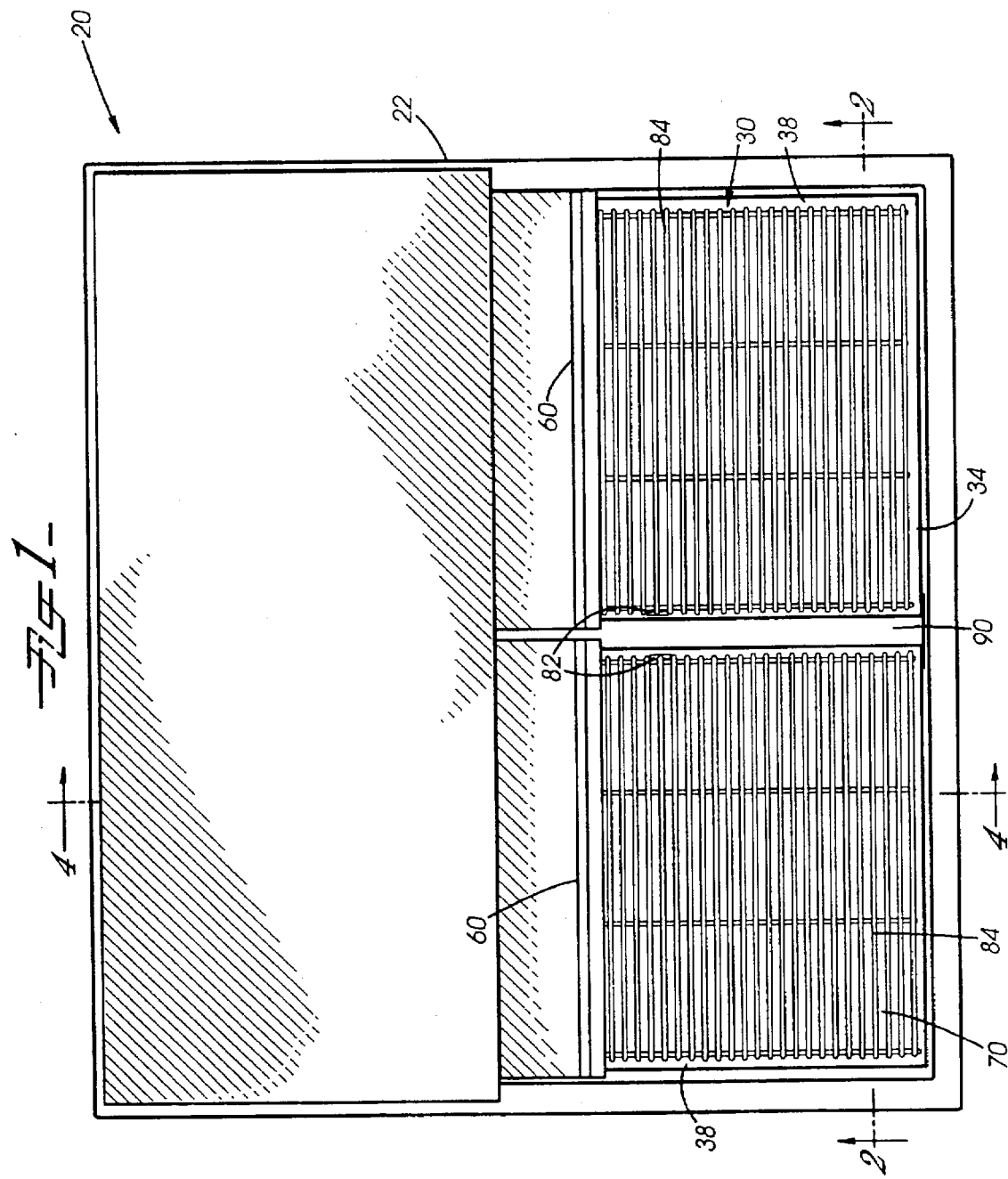
FIG. 1 is a top view of a cabinet with its door open, according to a preferred embodiment of the present invention.

Referring now to the figures, a cabinet 20 for storing and maintaining food 10 in a warm, humid environment is shown. Cabinet 20 is the type typically used in restaurants to keep bread, including rolls and buns, warm and moist. However, those of ordinary skill in the art will recognize that the ideas and innovations within the following detailed description of cabinet 20 may be used in other applications without departing from the spirit and scope of the present invention.

Cabinet 20 comprises a frame 22 carrying a storage compartment 30 which has an opening 40 therein. Opening 40 provides access to the interior of storage compartment 30 and is preferably positioned in the top of storage compartment 30. Storage compartment 30 is also defined by approximately verticals walls comprising a from wall 34, a rear wall 36, and a pair of side walls 38, each extending from the bottom 32 of storage compartment 30 to opening 40.

In order to produce the warm, humid air within storage compartment 30, a quantity of water 50, or water bath, is carried within the bottom 32 of storage compartment 30. Submerged within the water 50 are preferably two heating rods 52, each having their own internal thermostat and safety shut-offs. Heating rods 52 enter storage compartment 30 through its rear wall 36 and are connected to the necessary power sources. In addition, the thermostat of heating rod 52 may be set, thus controlling the temperature of water 50. This temperature is displayed on the exterior of cabinet 20 in a display 54, so that an operator can readily and visually ascertain the interior temperature of storage compartment 30.

Those of ordinary skill in the art will recognize that there are other methods of generating warm, humid air within storage compartment 30 without departing from the spirit and scope of the present invention. For instance, water may be sprayed onto a heating plate where it is vaporized to produce warm, humid air, while the heating plate or other heating device may be used to control the temperature within storage compartment 30.

Storage compartment 30 is also equipped with a water level sensor 42, which is tied into a water source 44 and a water inlet 46 so that if the water level drops too low within storage compartment 30, additional water is supplied to assure that heating reds 52 remain covered. Within the bottom 32 of storage compartment 30 is a drain 48 that allows water to be easily removed from storage compartment 30. This may be necessary when changing water 50 or when moving cabinet 20.

Figure 2:
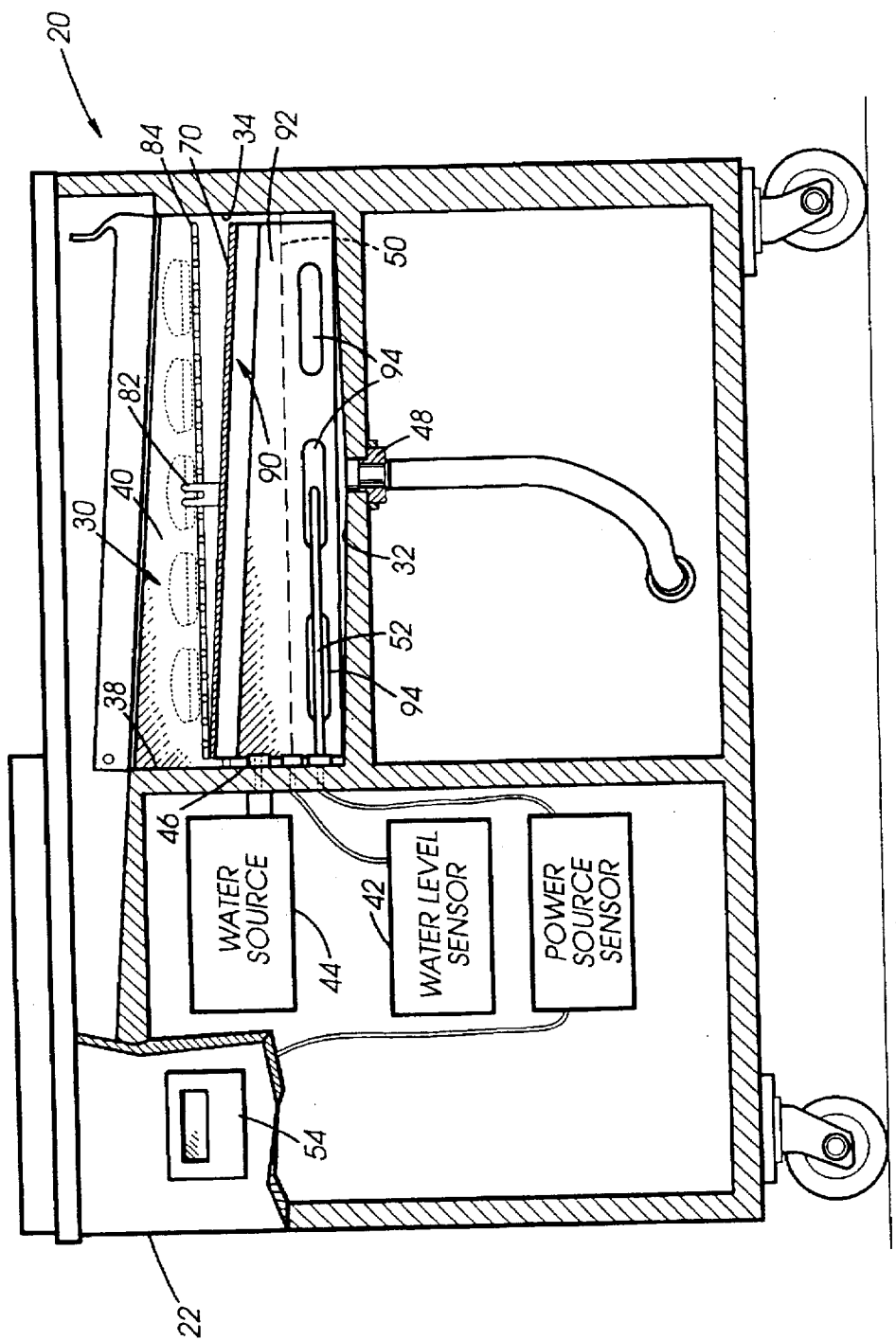
FIG. 2 is a cross-sectional view of the cabinet of FIG. 1 taken along line 2–2, according to a preferred embodiment of the present invention.
Figure 3:
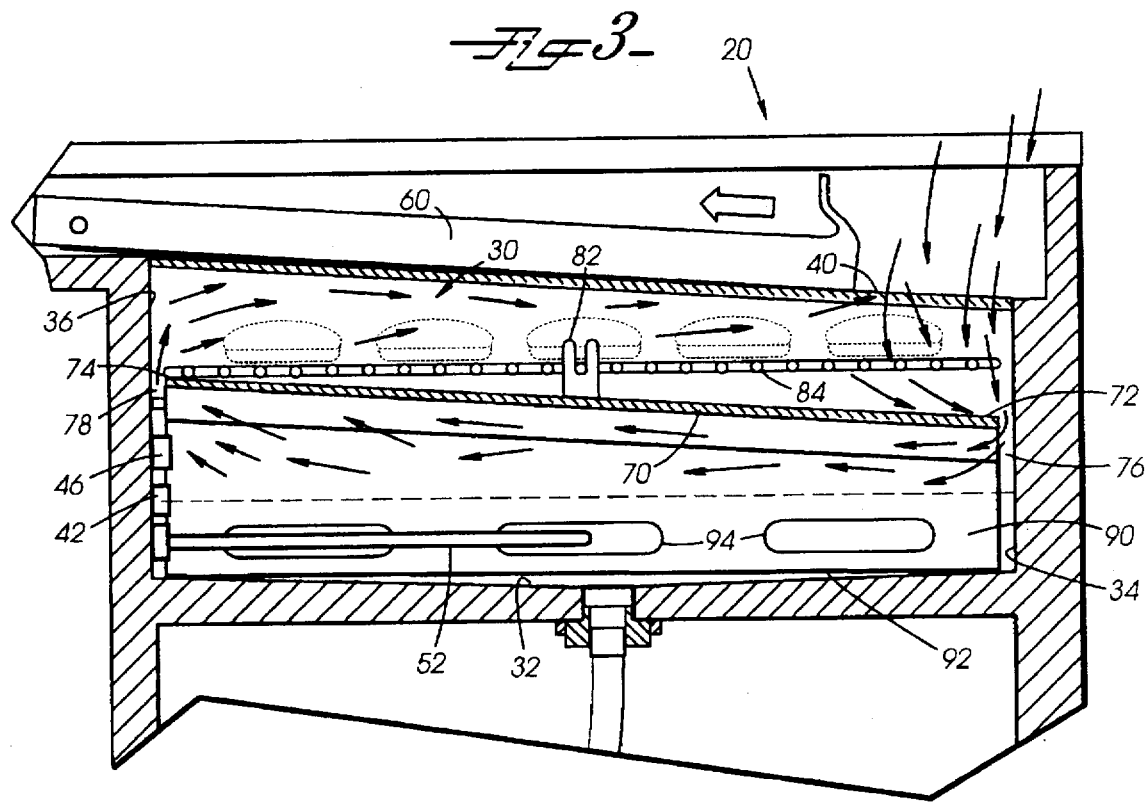
FIG. 3 is a detail cross-sectional view of FIG. 2 showing the storage compartment of the cabinet, according to a preferred embodiment of the present invention.

A door 60 is carried by storage compartment 30 over opening 40. Door 60 has a closed position, as shown in FIG. 2, and an open position, as shown in FIGS. 1 and 3. When door 60 is in its open position, access is available into the interior of storage compartment 30 through opening 40, and when door 60 is in its closed position, door 60 covers opening 40. Opening 40 is sloped downward toward the front wall 34 of storage compartment 30, and door 60 is provided with rollers 62 so that door 60 tends to roll toward its closed position from its open position. In other words, if door 60 is released in its open position, it will move to its closed position due to its rollers 62 and the slope of opening 40.

A support 70 is positioned within storage compartment 30 between water 50 and opening 40. Support 70 is preferably a pair of plates, each supported within storage compartment 30 by a plurality of pins (not shown) extending from side walls 38 and a baffle 90 positioned in the center of storage compartment 30 (see FIG. 1). Support 70 is positioned at an angle within storage compartment 30 so that the front end 72 of support 70 is closer to bottom 32 of storage compartment 30 than the back end 74 of support 70. In this position, there is a front gap 76 defined between the front end 72 of support 70 and the front wall 34 of storage compartment 30. There is also a rear gap 78 defined between the back end 74 of support 70 and the rear wall 36 of storage compartment 30. Front gap 76 and rear gap 78 are dimensioned to allow fluid to pass therethrough.

There are a pair of hooks 82 carried by each support 70. These hooks 82 provide a convenient place for an operator to grab when lifting support 70 out of storage compartment 30. In addition, each pair of hooks 82 holds a grill 84 in position. Grills 84 directly support the food 10 within storage compartment 30 in spaced relation to supports 70. Furthermore, in a preferred embodiment, grills 84 are positioned at an angle relative to supports 70, so that grills 84 are approximately perpendicular to walls 34, 36, 38 of storage compartment 30. It is important to keep the food 10 in spaced relation to supports 70, so that any condensate that forms on supports 70 will not contact the food 10 such that it would turn soggy. In addition, the angle of support 70 causes any condensation that does form to drain through front gap 76.

Baffle 90 extends from a position proximate to rear wall 36 to a position proximate to front wall 34. Baffle 90 is supported by a plurality of pins (not shown) extending from the front and rear walls 34, 36 of the storage compartment 30, and also by the bottom 32 of storage compartment 30. Baffle 90 has a middle section 92 that extends from the top of baffle 90 to the bottom 32 of storage compartment 30. Middle section 92 is solid above the water line; however, there are a plurality of holes 94 extending through middle section 92 that are submerged within water 50 when baffle 90 is in position. Holes 94 allow water 50 to migrate from the left side to the right side of the storage compartment 30 and vice-versa.

In use, heating rods 52 heat the water 50 to the desired temperature, preferably producing steam above the water level and below supports 70. When door 60 is in the closed position, steam migrates around supports 70 between front gap 76 and rear gap 78, thus coveting food 10 and keeping it warm and moist.

When the door to a typical food storage cabinet is opened, ambient air which is colder and drier than the air within the cabinet usually rushes in and changes the storage environment of the food. In the present invention, moving door 60 from its open position actually initiates air flow within storage compartment 30. Specifically, when door 60 is moved from its closed position, as shown in FIG. 3, ambient air enters storage compartment 30. The ambient air, being cooler than the air within storage compartment 30, is predisposed to settle to the lowest spot (as shown by arrows in FIG. 3). Consequently, the air directly over front gap 76 fails below supports 70, while the remaining air slides down supports 70 through front gap 76. This increase in air below supports 70 increases the relative pressure in this region and thus forces air from beneath supports 70 out through rear gap 78. As the air flows through rear gap 78, it is directed over the food 10 and toward the front 34 of storage compartment 30 (also shown in FIG. 3). Thus, each and every time door 60 is moved from its closed position, warm, humid air from beneath supports 70 is caused to "roll" over the food 10, maintaining it in a warm, moist condition. In addition, contrary to other food cabinets, the present invention actually uses the frequent openings of door 60 to initiate air flow within storage compartment 30 and to direct the warm, humid air over the food 10, thus reducing recovery time of cabinet 20.

Baffle 90 and its middle section 92 also serve an important function in the flow of air within storage compartment 30. Specifically, baffle 90 prevents air from flowing between side walls 38 but facilitates the directional flow of air down through the front gap 76, up through the rear gap 78, and over the food 10. In other words, baffle 90 and middle section 92 operate much like a vane to direct air flow from front to back in storage compartment 30, instead of from side to side.

Figure 5:
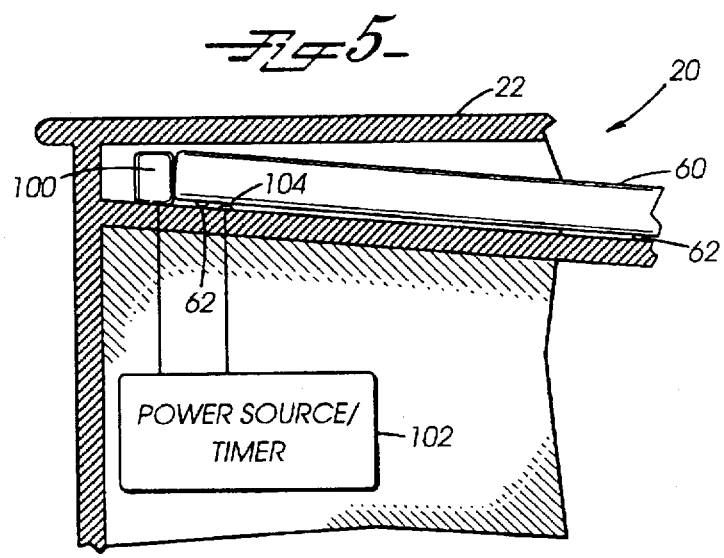
FIG. 5 is a partial schematic view of the electro-magnet of a cabinet, according to a preferred embodiment of the present invention.

In FIG. 5, a schematic diagram is shown illustrating another feature of the present invention. In particular, door 60 is constructed from ferromagnetic metal, so that as door 60 is moved to its completely open position, an electro-magnet 100 magnetically holds door 60 in this position. Electro-magnet 100 is connected to a power source and timer 102, such that door 60 is temporarily held open for a predetermined amount of time, after which it is released so that it may slowly roll to its closed position.

In operation, as door 60 is moved to its completely open position, a limit switch 104 is tripped, thus energizing electro-magnet 100. Once door 60 moves into a position close enough to electro-magnet 100, the attractive force between the two holds door 60 in its open position. However, once the predetermined amount of time has lapsed, power source 102 is removed from electro-magnet 100, thus removing its attractive properties and releasing door 60.

While in the drawings limit switch 104 is illustrated by a depression switch that is activated when engaged by rollers 62 of door 60, those of ordinary skill in the art will recognize that any limit switch is able to determine the proximity of door 60 to electro-magnet 100. Furthermore, it will be recognized that other devices may be used to temporarily hold door 60 in its open position without departing from the spirit and scope of the present invention.

Another preferred embodiment of the present invention is shown in FIGS. 6 and 7. Cabinet 20 is provided with a drying chamber 110 having a motor 120 driven fan 112 positioned therein which draws in air through a hole 26 in the top 24 of frame 22. The air is forced across a heating element 114 which dries and heats the air before the air is introduced into storage chamber 30. The air is forced into storage compartment 30 through inlets by fan 112 and travels across a pair of inlet vanes 116 in rear wall 36 of storage compartment 30, which direct the air upward toward the underside 64 of doors 60. As the air travels toward front wall 34 of storage compartment 30, the air prevents excessive condensation from forming on the underside 64 of doors 60, and thus prevents the food 10 from becoming overly moist. In addition, because of the direction of inlet vanes 116, the flow of air introduced by fan 112 facilitates the circulation of air within storage compartment 30 when doors 60 are opened.

Without the use of drying chamber 110, condensation may form on the underside 64 of doors 60 and drip onto the food 10. In addition, because of the super saturation of the air without drying chamber 110, condensation will at times form on the food 10 itself, thus damaging it. Consequently, by using drying chamber 110 as described above, cabinet 20 maintains the food 10 in its optimum condition.

It will be apparent to those skilled in the art that many changes and substitutions can be made to the preferred embodiment herein described without departing from the spirit and scope of the present invention as defined by the appended claims.

What is claimed is:

1. A cabinet for storing food, said cabinet comprising:
 a storage compartment having an opening therein for allowing access to the interior of said storage compartment, said storage compartment having a front, a rear, and a bottom;
 a door carried by said storage compartment, said door having an open position and a closed position, said door covering said opening when said door is in said closed position;

a support carried within said storage compartment, said support adapted to support the food within said storage compartment, said support having a front end and a back end, said support positioned between said bottom of said storage compartment and said opening, and said support positioned at an angle within said storage compartment so that said front end is positioned closer to said bottom of said storage compartment than said back end; and means communicating with the interior of said storage compartment for generating warm, humid air.

2. The cabinet as recited in claim 1, wherein said generating means comprises a water bath having a heating device submerged therein.

3. The cabinet as recited in claim 1, wherein said support and said generating means are positioned within said storage compartment so that when said door is moved from said closed position, air flow within said storage compartment is initiated.

4. The cabinet as recited in claim 1, wherein said support is positioned so as to define a front gap between said front end of said support and said front of said storage compartment and to define a rear gap between said rear end of said support and said rear of said storage compartment.

5. The cabinet as recited in claim 4, wherein said support and said generating means are positioned within said storage compartment so that when said door is moved from said closed position to said open position, said warm, humid air flows from beneath said support through said rear gap toward said front of said storage compartment.

6. The cabinet as recited in claim 4, wherein said support and said generating means are positioned within said storage compartment so that when said door is moved from said closed position to said open position, ambient air outside of said cabinet enters said storage compartment and is directed through said front gap, the flow of ambient air through said front gap causing said warm, humid air from beneath said support to flow through said rear gap toward said front of said storage compartment.

7. The cabinet as recited in claim 1, further comprising a grill carried by said support, said grill adapted to support the food in spaced relation to said support, said grill positioned at a non-perpendicular angle relative to said support.

8. The cabinet as recited in claim 1, further comprising a baffle carried within said storage compartment, said baffle positioned between said support and said bottom of said storage compartment, said baffle having means for directing air flow within said storage compartment.

9. A cabinet for storing food, said cabinet comprising:
a storage compartment having an opening therein for allowing access to the interior of said storage compartment, said storage compartment having a front, a rear, and a bottom;

a door carried by said storage compartment, said door having an open position and a closed position, said door covering said opening when said door is in said closed position;

a support carried within said storage compartment, said support adapted to support the food within said storage compartment, said support having a front end and a back end, said support positioned between said bottom of said storage compartment and said opening, and said support positioned at an angle within said storage compartment so that said front end is positioned closer to said bottom of said storage compartment than said rear end, said support positioned within said storage compartment so as to define a front gap between said front end of said support and said front of said storage compartment and a rear gap between said rear end of said support and said rear of said storage compartment;

a baffle positioned beneath said support within said storage compartment, said baffle engaging and supporting said support; and heated water carried within said storage compartment beneath said support, said heated water producing warm, humid air in said storage compartment.

10. The cabinet as recited in claim 9, wherein said baffle further comprises means for directing air flow within said storage compartment.

11. The cabinet as recited in claim 9, wherein said baffle has a portion submerged within said heated water, said portion of said baffle submerged within said water having means for allowing said heated water to migrate through said baffle.

12. The cabinet as recited in claim 9, wherein said support, said baffle and said heated water are positioned within said storage compartment so that when said door moves from said closed position to said open position, said warm, humid air positioned beneath said support and above said heated water flows up through said rear gap over the food toward said front of said storage compartment.

13. The cabinet as recited in claim 9, wherein said support, said baffle and said heated water are positioned within said storage compartment so that when said door moves from said closed position to said open position, said warm, humid air moves from said rear of said storage compartment over the food toward said front of said storage compartment.

14. The cabinet as recited in claim 9, wherein said storage compartment has walls; and said cabinet further comprises a grill carried by said support, said grill adapted to support the food in spaced relation to said support, said grill positioned approximately perpendicular to said walls of said storage compartment.

15. A cabinet for storing food, said cabinet comprising:
a frame;

a storage compartment carried by said frame, said storage compartment having an opening therein for allowing access into the interior of said storage compartment;

a door carried by said storage compartment, said door having an open position and a closed position, said door covering said opening when said door is in said closed position, said door allowing access through said opening when said door is moved from said closed position; and means carried by said frame for holding said door in said open position.

16. The cabinet as recited in claim 15, wherein said opening is angled so that said door moves from said open position to said closed position unless held in said opened position.

17. The cabinet as recited in claim 16, wherein said holding means temporarily holds said door in said open position for a predetermined amount of time.

18. The cabinet as recited in claim 16, further comprising a switch carried by said frame which activates said holding means for a predetermined amount of time.

19. The cabinet as recited in claim 15, wherein said door is made of ferromagnetic material, and wherein said holding means comprises an electro-magnet that when activated is magnetically attracted to said door, so that said door is held in said open position.

20. The cabinet as recited in claim 15, wherein said opening is angled so that said door moves from said open position to said closed position unless held in said open position; wherein said holding means comprises an electro-magnet which attracts said door when activated to hold said door in said open position for a predetermined amount of time; and said cabinet further comprising a switch carried by said frame for activating said electro-magnet.

21. A cabinet for storing food, said cabinet comprising:
- a storage compartment having an opening therein for allowing access to the interior of said storage compartment, said storage compartment having a front, a rear, and a bottom;
- a door carried by said storage compartment, said door having an open position and a closed position, said door covering said opening when said door is in said closed position;
- a support carried within said storage compartment, said support adapted to support the food within said storage compartment;
- a chamber in communication with said storage compartment, said chamber having means for heating, drying and forcing air into said storage compartment; and
means communicating with the interior of said storage compartment for generating warm, humid air.

22. The cabinet as recited in claim 21, wherein said rear of said storage compartment has an inlet for receiving the air from said chamber.

23. The cabinet as recited in claim 22, wherein said forcing means further comprises a fan and said heating and drying means further comprises a heating element, said heating element positioned between said inlet and said fan.

24. The cabinet as recited in claim 21, wherein said forcing means further comprises a fan for drawing the air into said chamber and forcing the air into said storage compartment.

25. The cabinet as recited in claim 21, wherein said storage compartment has an inlet for receiving the air from said chamber, said inlet having means for directing the air upward toward said door.

* * * * *